United States Patent
Yoda et al.

(10) Patent No.: US 8,540,282 B2
(45) Date of Patent: Sep. 24, 2013

(54) PROTECTING STRUCTURE FOR POWER SOURCE APPARATUS

(75) Inventors: Takehito Yoda, Toyota (JP); Yuichi Niiyama, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/812,413

(22) PCT Filed: Mar. 27, 2009

(86) PCT No.: PCT/JP2009/056320
§ 371 (c)(1),
(2), (4) Date: Jul. 9, 2010

(87) PCT Pub. No.: WO2009/139229
PCT Pub. Date: Nov. 19, 2009

(65) Prior Publication Data
US 2010/0289295 A1    Nov. 18, 2010

(30) Foreign Application Priority Data
May 16, 2008    (JP) ................. 2008-129753

(51) Int. Cl.
*B62D 21/15*    (2006.01)
*B60R 16/04*    (2006.01)

(52) U.S. Cl.
USPC .......... 280/784; 180/68.5; 180/232; 180/271

(58) Field of Classification Search
USPC ............... 180/68.5, 232, 271, 312; 280/781, 280/782, 783, 784
See application file for complete search history.

(56) References Cited

U.S. PATENT DOCUMENTS

| | | | | |
|---|---|---|---|---|
| 5,373,910 A * | 12/1994 | Nixon | ........................... | 180/65.1 |
| 6,227,322 B1 * | 5/2001 | Nishikawa | .................... | 180/68.5 |
| 6,648,085 B2 * | 11/2003 | Nagura et al. | ............... | 180/65.1 |
| 7,066,515 B2 * | 6/2006 | Pierce et al. | .................... | 296/21 |
| 7,070,015 B2 * | 7/2006 | Mathews et al. | ............. | 180/68.5 |
| 7,424,926 B2 * | 9/2008 | Tsuchiya | .................... | 180/68.5 |

(Continued)

FOREIGN PATENT DOCUMENTS

| | | |
|---|---|---|
| JP | 06-032247 A | 2/1994 |
| JP | 2001-113959 A | 4/2001 |

(Continued)

OTHER PUBLICATIONS

International Search Report of PCT/JP2009/056320 dated Jun. 23, 2009.

*Primary Examiner* — Joseph Rocca
*Assistant Examiner* — Barry Gooden, Jr.
(74) *Attorney, Agent, or Firm* — Sughrue Mion, PLLC

(57) ABSTRACT

[PROBLEMS] The present invention provides a protecting structure for a power source apparatus capable of suppressing the action of an external force on the power source apparatus when a vehicle is subjected to a shock.

[SOLVING MEANS] A protecting structure for a power source apparatus, has a frame unit in which a plurality of frames (21*a* to 21*h*) are connected to each other and surround the power source apparatus (30) mounted on a vehicle; and an abutting member (22) connected to the frame unit and extending in a direction in which the abutting member abuts on a vehicle body. The abutting member is arranged so as to extend in a direction in which an external force in a predetermined direction acts on the vehicle.

9 Claims, 9 Drawing Sheets

(56) References Cited

U.S. PATENT DOCUMENTS

| | | | |
|---|---|---|---|
| 7,926,602 B2* | 4/2011 | Takasaki | 180/68.5 |
| 2004/0079569 A1* | 4/2004 | Awakawa | 180/68.5 |
| 2004/0226765 A1* | 11/2004 | Mathews et al. | 180/68.5 |
| 2005/0260488 A1* | 11/2005 | Zhou et al. | 429/99 |
| 2006/0096797 A1* | 5/2006 | Tsuchiya | 180/68.5 |
| 2007/0215399 A1* | 9/2007 | Watanabe et al. | 180/68.5 |
| 2008/0173488 A1 | 7/2008 | Takasaki | |
| 2008/0173489 A1 | 7/2008 | Takasaki | |
| 2009/0166116 A1* | 7/2009 | Kiya et al. | 180/68.5 |
| 2010/0170736 A1* | 7/2010 | Watanabe et al. | 180/68.5 |

FOREIGN PATENT DOCUMENTS

| | | |
|---|---|---|
| JP | 2004-224084 A | 8/2004 |
| JP | 2007-253933 A | 10/2007 |
| JP | 2008-162499 A | 7/2008 |
| JP | 2008-162500 A | 7/2008 |

* cited by examiner

PROTECTING STRUCTURE FOR POWER SOURCE APPARATUS

TECHNICAL FIELD

The present invention relates to a protecting structure in which a power source apparatus mounted on a vehicle is surrounded by a plurality of frames to protect the power source apparatus against shocks from the outside.

BACKGROUND ART

Secondary batteries have conventionally been mounted on vehicles such that the output from the secondary battery is used to run the vehicle or the secondary battery is charged with regenerative energy from the vehicle (for example, see Patent Documents 1 and 2). In such a vehicle, it is necessary to suppress the application of an excessive load to the secondary battery to prevent damage to the secondary battery when the vehicle is subjected to an external force in a collision.

To address this, in Patent Document 1, a floor panel is formed to be easy-to-deform to absorb shocks so that no external force may act on a battery. In Patent Document 2, a bracket connected to a battery pack has a rotatable configuration and the bracket is rotated to absorb a shock when a vehicle is subjected to the shock.

Patent Document 1: Japanese Patent Laid-Open No. 2001-113959 (Paragraph No. 0013)
Patent Document 2: Japanese Patent Laid-Open No. 2007-253933 (FIGS. 1, 7, and 8)

DISCLOSURE OF THE INVENTION

Problems to be Solved by the Invention

Patent Document 1, however, discloses the configuration in which the battery is merely fixed to the floor panel. An external force may act on the battery depending on the magnitude of the external force applied to a vehicle. On the other hand, Patent Document 2 discloses the configuration in which the battery pack is fixed to a floor panel by using bolts. An external force may act on the battery pack depending on the magnitude of the external force applied to the vehicle.

It is thus an object of the present invention to provide a protecting structure for a power source apparatus capable of suppressing the action of an external force on the power source apparatus when a vehicle is subjected to a shock.

Means for Solving the Problems

According to the present invention, a protecting structure for a power source apparatus comprises a frame unit in which a plurality of frames are connected to each other and surround the power source apparatus mounted on a vehicle; and an abutting member extending in a direction in which an external force in a predetermined direction acts on the vehicle, one end thereof connected to the frame unit, and the other end thereof being away from the vehicle body, wherein the abutting member is displaced in the predetermined direction in response to displacement of the frame unit subjected to the external force in the predetermined direction and the other end of the abutting member abuts on the vehicle body.

The frame unit can be fixed to the vehicle body through a fixing member. According to the protecting structure of the present invention, it is possible to absorb an external force by abutting the abutting member on the vehicle body. Therefore it is not necessary to strengthen fixing of the fixing member. Specifically, the structure of the fixing member can be simplified.

The power source apparatus can be placed in a rearward position of the vehicle. In addition, the power source apparatus can be formed of a secondary battery. Specifically, the power source apparatus comprises an assembled battery having a plurality of cells (secondary battery) and a case housing the assembled battery. The vehicle body on which the abutting member abuts is a cross member extending in a direction from left to right of the vehicle.

According to another aspect, the present invention provides a frame unit in which a plurality of frames are connected to each other and surround a power source apparatus mounted on a vehicle, wherein, of the plurality of frames, a frame placed along a lower surface of the power source apparatus is formed integrally with a frame placed along a side face of the power source apparatus.

According to another aspect, the present invention provides a frame unit in which a plurality of frames are connected to each other and surround a power source apparatus mounted on a vehicle, wherein the plurality of frames include two frames placed along side faces of the power source apparatus and extending in directions orthogonal to each other. One of the two frames has a projection portion which abuts on the other frame to prevent deformation of the frame.

Effect of the Invention

According to the present invention, the frame unit formed of the plurality of frames is used to surround the power source apparatus, so that when an external force is applied to the vehicle, the direct action of the external force on the power source apparatus can be suppressed. In addition, since the abutting member extending in the direction in which the abutting member abuts on the vehicle body is connected to the frame unit, the external force applied to the frame unit can be conveyed to the vehicle body through the abutting member. This can suppress the action of the external force on the power source apparatus through the frame unit.

EMBODIMENT OF THE INVENTION

Preferred embodiments of the present invention will hereinafter be described.

Embodiment 1

Figure 1:
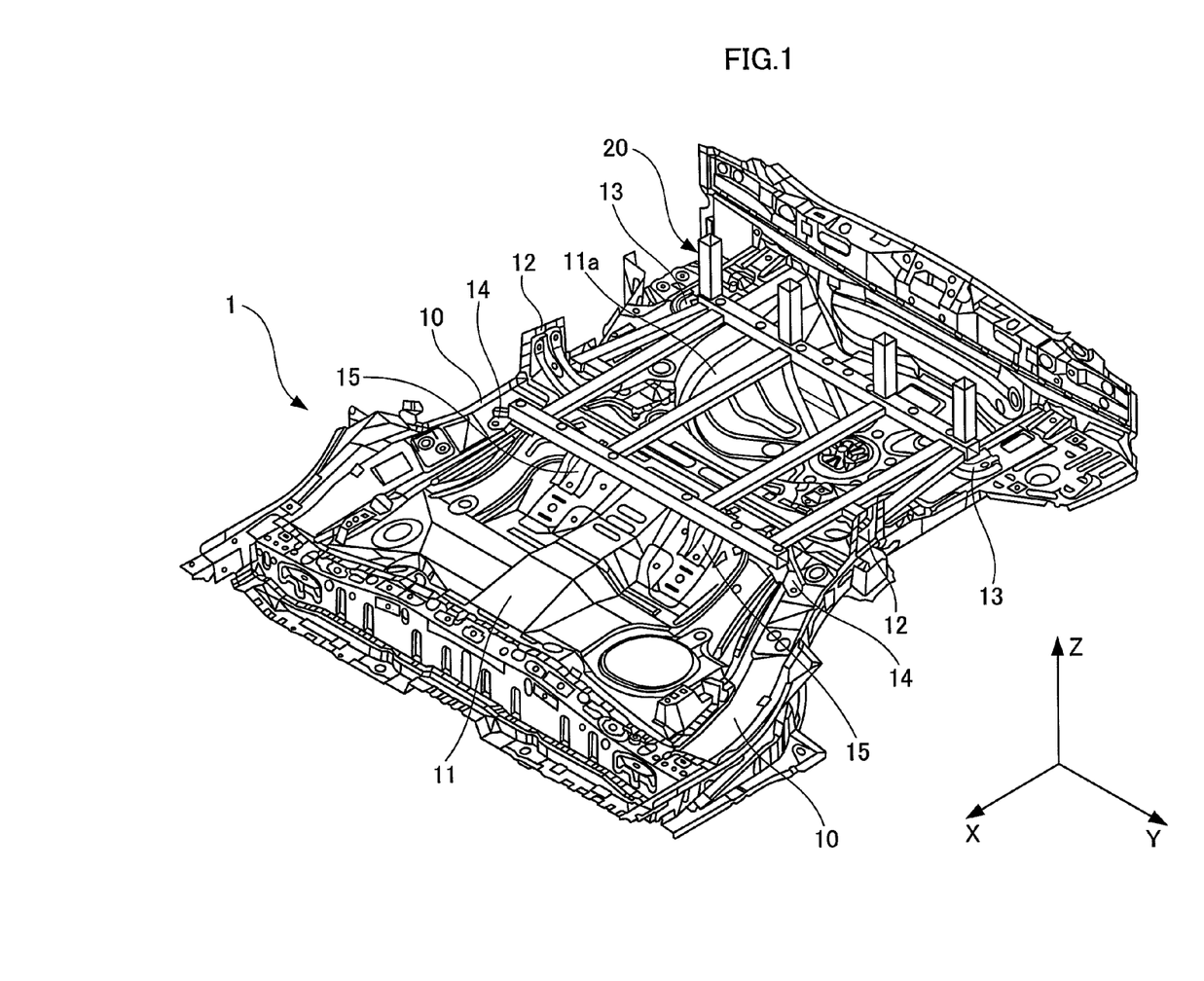
FIG. 1 A perspective view of the outer appearance showing the configuration of a portion of a vehicle in Embodiment 1 of the present invention.

A vehicle in Embodiment 1 of the present invention will be described with reference to FIG. 1. FIG. 1 is a perspective view of the outer appearance showing the configuration of a portion of the vehicle in the present embodiment. In FIG. 1, an X axis, a Y axis, and a Z axis are axes orthogonal to each other. The X axis corresponds to a traveling direction of the vehicle. The traveling direction refers to a direction in which the vehicle runs forward and backward. The Y axis corresponds to a transverse direction of the vehicle, and the Z axis corresponds to a direction of gravity.

The vehicle in the present embodiment is a vehicle on which a battery pack (power source apparatus) is mounted. Examples of the vehicle include a hybrid vehicle and an electric vehicle. The hybrid vehicle is a vehicle which has not only the battery pack but also another power source such as an internal combustion engine or a fuel battery which outputs energy for use in running of the vehicle. The electric vehicle is a vehicle which runs only with the output from the battery pack. The battery pack in the present embodiment is discharged to output energy for use in running of the vehicle or is charged with energy produced in braking of the vehicle or with power supplied from the outside of the vehicle.

A vehicle body 1 has a pair of side members 10 extending in the X direction, a cross member 12 extending in the Y direction and connected to the pair of side members 10, and a floor panel 11 fixed to the pair of side members 10. The side members 10 and the cross member 12 constitute the skeleton of the vehicle body 1.

The floor panel 11 has a housing portion 11a formed therein for housing a spare tire. The housing portion 11a can be omitted. A protecting frame (protecting structure) 20 is placed above the housing portion 11a of the floor panel 11. The protecting frame 20 is provided for protecting the battery pack mounted on the vehicle. Specifically, the protecting frame 20 has a structure which surrounds the periphery of the battery pack to prevent the direct action of an external force on the battery pack.

The specific configuration of the protecting frame 20 will be described later. As shown in FIG. 1, the protecting frame 20 is placed in a rearward position of the vehicle body 1. For example, the protecting frame 20 (battery pack) can be placed in a luggage room of the vehicle.

Figure 2:
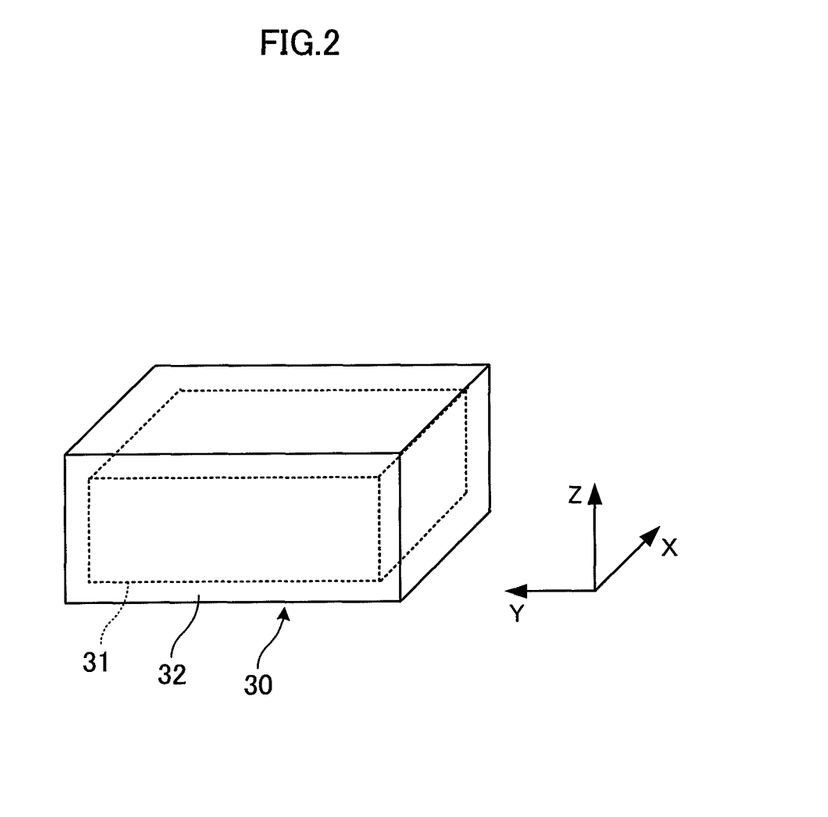
FIG. 2 A schematic diagram showing the configuration of a battery pack.

As shown in FIG. 2, the battery pack 30 has an assembled battery 31 and a case 32 for housing the assembled battery 31. The assembled battery 31 is fixed to the case 32 by fastening members such as bolts, and the case 32 is fixed to the protecting frame 20 through fastening members such as bolts. The assembled battery 31 is formed of a plurality of cells connected electrically in series through a bus bar. A secondary battery such as a nickel metal hydride battery or a lithium-ion battery can be used as the cell. Instead of the secondary battery, an electric double layer capacitor (capacitor) can be used.

The cell may have any shape, and for example, a cylindrical type or a square type can be used. It is possible to supply a gas for adjusting the temperature of the assembled battery 31 into the case 32. Specifically, a gas for cooling can be supplied to suppress a rise in temperature of the assembled battery 31. In addition, a gas for heating can be supplied to suppress a drop in temperature of the assembled battery 31. A fluid can be housed in the case 32 instead of the gas. Specifically, an insulating fluid can be housed to promote heat transfer between the assembled battery 31 and the case 32. As the insulating fluid, an insulating oil or a fluorochemical inert fluid can be used.

As shown in FIG. 1, the protecting frame 20 is fixed to the side members 10 and the floor panel 11 through a plurality of fixing members 13, 14, and 15.

A pair of first fixing members 13 is connected to the portion of the protecting frame 20 that is located in a rearward position of the vehicle. The first fixing members 13 are fixed to the associated side members 10 by fastening members such as bolts. A pair of second fixing members 14 and a pair of third fixing members 15 are connected to the portions of the protecting frame 20 that are located in a forward position of the vehicle. The second fixing members 14 are fixed to the associated side members 10 by fastening members such as bolts. The third fixing members 15 are located between the pair of second fixing members 14 in the Y direction and are fixed to the floor panel 11 by fastening members such as bolts.

Figure 3:
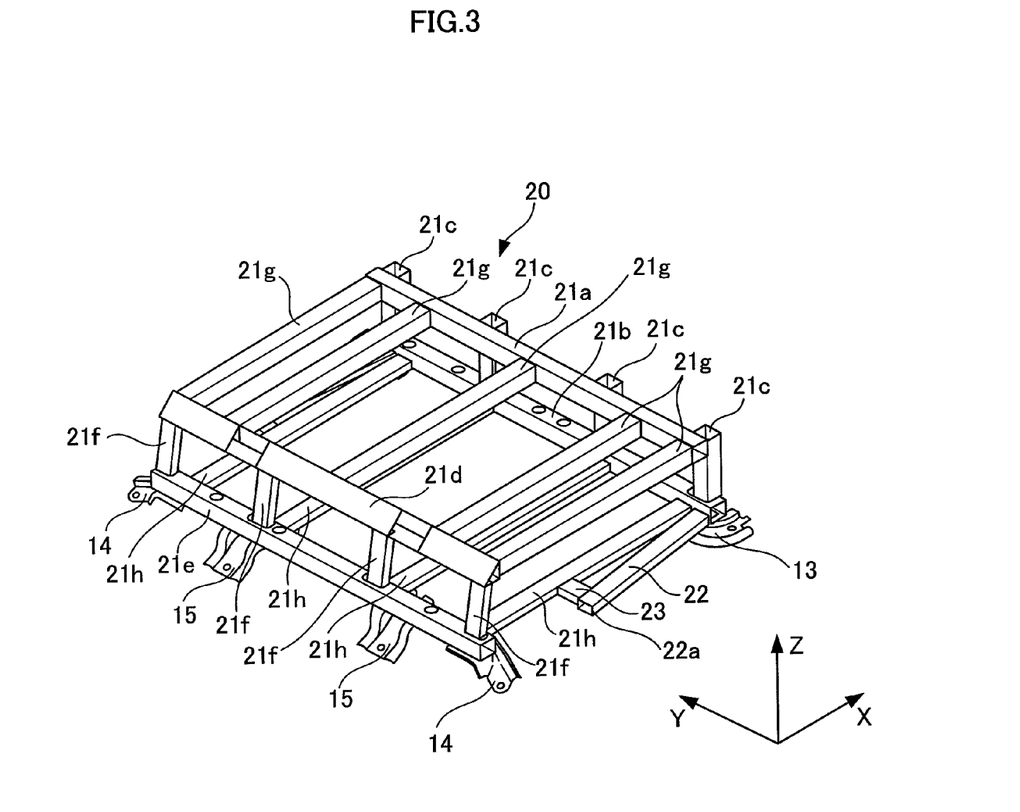
FIG. 3 A perspective view of the outer appearance showing the configuration of a protecting frame in Embodiment 1.
Figure 4:
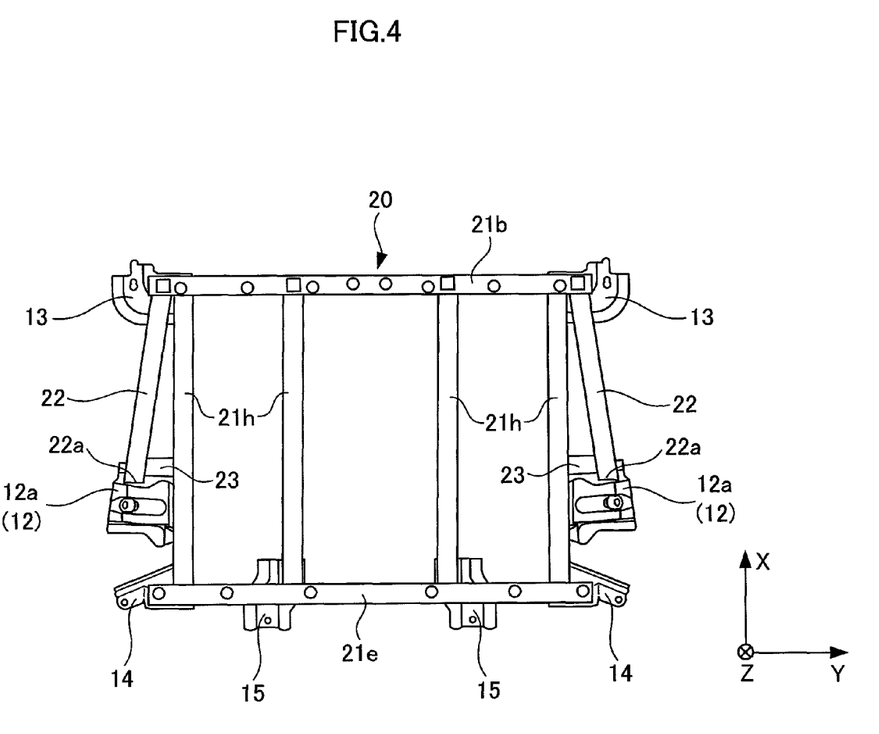
FIG. 4 A top view showing the configuration of a portion of the protecting frame in Embodiment 1.

Next, the configuration of the protecting member 20 will be described with reference to FIGS. 3 and 4. FIG. 3 is a perspective view showing the outer appearance of the protecting frame 20. FIG. 4 is a diagram illustrating the protecting frame 20 viewed from the top (Z direction) and showing the configuration of a portion of the protecting frame 20.

A first frame 21a is located on a rearward side of the vehicle and extends in the Y direction. A second frame 21b is located in the direction of gravity (downward direction) relative to the first frame 21a and extends in the Y direction. The first frame 21a and the second frame 21b are placed generally in parallel within a Y-Z plane. The lengths of the first frame 21a and the second frame 21b in the Y direction are larger than the length of the battery pack 30 in the Y direction. The first fixing members 13 are connected to both ends of the second frame 21b.

Four third frames 21c extending in the Z direction are connected to the first frame 21a and the second frame 21b. The third frame 21c has a length larger than that of the battery pack 30 in the Z direction. The four third frames 21c are placed at equal intervals in the Y direction. While the four third frames 21c are provided in the present embodiment, the present invention is not limited thereto. The number of the third frames 21c and the interval between the third frames 21c can be set as appropriate. Specifically, the number and the like of the third frames 21c can be set in view of the strength and the like of the protecting frame 20.

A fourth frame 21d is located in a forward position of the vehicle and extends in the Y direction. In contrast to the other frames, the fourth frame 21d has a triangular shape in section orthogonal to a longitudinal direction of the fourth frame 21d. A fifth frame 21e is located in the direction of gravity (downward direction) relative to the fourth frame 21d and extends in the Y direction. The second fixing members 14 are connected to both ends of the fifth frame 21e. The third fixing members 15 are connected to central portions of the fifth frame 21e.

The lengths of the fourth frame 21d and the fifth frame 21e in the Y direction are larger than the length of the battery pack 30 in the Y direction. Four sixth frames 21f are connected to the fourth frame 21d and the fifth frame 21e. The sixth frames 21f extend in the Z direction such that they are inclined with respect to the Y-Z plane. Specifically, the end portions of the sixth frames 21f that are connected to the fifth frames 21e are located forward of the vehicle with respect to the end portions of the sixth frames 21f that are connected to the fourth frames 21d. The four sixth frames 21f are placed at equal intervals in the Y direction.

While the sixth frames 21f are inclined with respect to the Y-Z plane in the present embodiment, the present invention is not limited thereto. Specifically, the sixth frames 21f can be placed along the Z direction similarly to the third frames 21c. While the four sixth frames 21f are provided in the present embodiment, the present invention is not limited thereto. The number of the sixth frames 21f and the interval between the sixth frames 21f can be set as appropriate. Specifically, the number and the like of the sixth frames 21f can be set in view of the strength and the like of the protecting frame 20.

Five seventh frames 21g extending in the X direction are connected to the first frame 21a and the fourth frame 21d. The first frame 21a, the fourth frame 21d, and the seventh frames 21g are located in the same plane (in an X-Y plane) and constitute an upper plane of the protecting frame 20. The number of the seventh frames 21g and the interval between the seventh frames 21g can be set as appropriate.

Four eighth frames 21h extending in the X direction are connected to the second frame 21b and the fifth frame 21e. The second frame 21b, the fifth frame 21e, and the eighth frames 21h are located in the same plane (in the X-Y plane) and constitute a lower plane of the protecting frame 20. The interval between the upper plane and the lower plane of the protecting frame 20 is larger than the length of the battery pack 30 in the Z direction. The lengths of the eighth frames 21h and the seventh frames 21g in the X direction are larger than the length of the battery pack 30 in the X direction. The number of the eighth frames 21h and the interval between the eighth frames 21h can be set as appropriate.

Abutting frames (abutting members) 22 extending toward the cross member 12 are connected to both ends of the second frame 21b. The abutting frames 22 and the four eighth frames 21h are located in the same plane (in the X-Y plane), and the abutting frames 22 are placed such that they are inclined with respect to the eighth frames 21h. As shown in FIG. 4, the abutting frames 22 are placed in a rearward position of the vehicle relative to the cross member 12, and a portion of the cross member 12 and the abutting frames 22 are located in the same plane (in the X-Y plane).

An area of each of the abutting frames 22 closer to its end is connected to the eighth frame 21h through a support frame 23. The support frame 23 is provided for supporting the area of the abutting frame 22 closer to the end. The support frame 23 can be omitted.

Protruding portions 12a protruding in the Z direction are formed at both end portions of the cross members 12. The protruding portion 12a has a surface opposed to an end portion 22a of the abutting frame 22. A predetermined clearance is provided between the protruding portion 12a and the end portion 22a of the abutting frame 22. The clearance is provided for preventing interference between the end portion 22a of the abutting frame 22 and the protruding portion 12a of the cross member 12 in mounting the protecting frame 20 on the vehicle body 1.

The frames 21a to 21h, 22, and 23 constituting the protecting frame 20 can be connected to each other by welding or can be connected by using fastening members such as bolts.

Figure 5:
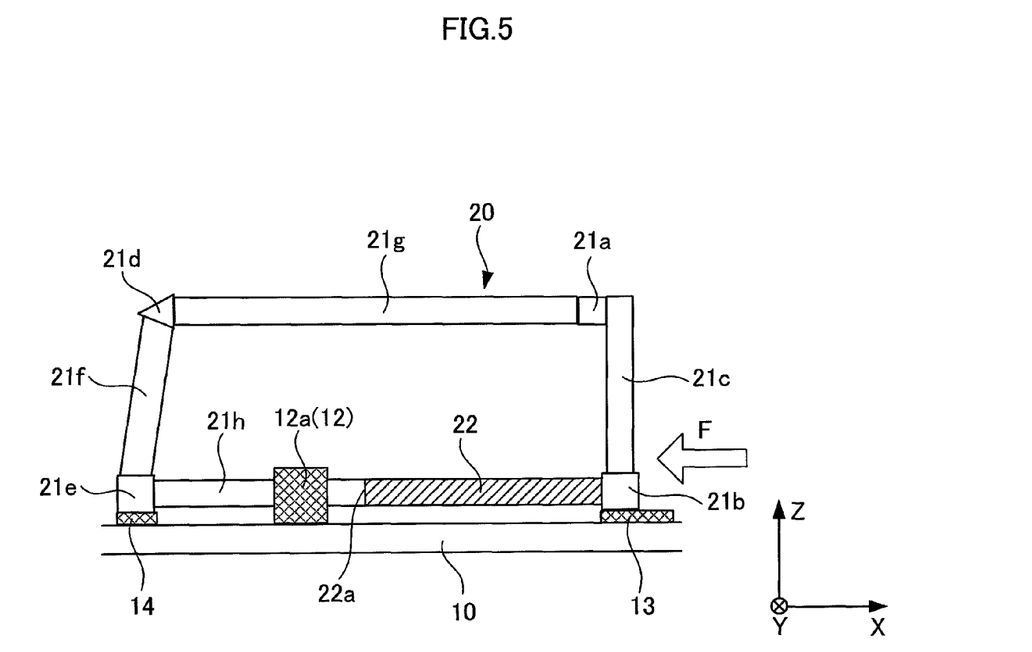
FIG. 5 A side view showing the configuration of the protecting frame in Embodiment 1.

Next, the functions of the protecting frame 20 of the present embodiment will be described with reference to FIG. 5. FIG. 5 is a side view showing the configuration of the protecting frame 20.

When an excessive load (external force) is applied to a rearward portion of the vehicle in a collision or the like of the vehicle, the portion of the floor panel 11 that is located in a rearward position of the vehicle is deformed. Such deformation of the floor panel 11 can absorb the external force. The external force is also applied to the protecting frame 20 depending on the degree of the deformation of the floor panel 11. In FIG. 5, an arrow represents the external force F acting on the protecting frame 20.

For example, when the external force F exceeds the yield point of the first fixing members 13, the protecting frame 20 is displaced in the direction in which the external force F acts, so that the end portion 22a of the abutting frame 22 abuts on the protruding portion 12a of the cross member 12. This causes the external force F acting on the protecting frame 20 to be transferred to the cross member 12 through the abutting frame 22. Since the cross member 12 is subjected to the external force F through the abutting frame 22, the cross member 12 is deformed to absorb the external force F.

The cross member 12 is a member constituting part of the skeleton of the vehicle body 1, and thus the external force F transferred to the cross member 12 through the abutting frame 22 is converted into force which will run the vehicle forward. The forward running of the vehicle can absorb the external force F.

It is contemplated that the connecting portion between the protecting frame 20 and the vehicle body 1 can have a robust structure in order to prevent detachment of the protecting frame 20 from the vehicle body 1 due to the external force F acting on the protecting frame 20. In this case, however, the number of parts used in the connecting portion is increased. A configuration in which the protecting frame 20 and the vehicle body 1 are merely fixed mechanically to each other has a limit to the external force F, and the protecting frame 20 may be detached from the vehicle body 1 depending on the magnitude of the external force F.

Since the battery pack 30 is surrounded by the protecting frame 20 in the present embodiment, the direct action of the external force on the battery pack 30 can be suppressed even when the vehicle is subjected to a shock. Specifically, the external force reaches the protecting frame 20 before it reaches the battery pack 30, so that the application of an excessive load to the battery pack 30 can be prevented.

Alternatively, the battery pack 30 can be reinforced to ensure the strength of the battery pack 30. The use of the configuration of the protecting frame 20 in the present embodiment, however, can result in a simpler configuration. Specifically, if the battery pack 30 is reinforced, a complicated reinforcement structure should be used, but the protecting frame 20 in the present embodiment can be realized with a simpler structure since it is provided by simply combining the plurality of frames.

In the present embodiment, the external force F acting on the protecting frame 20 is transferred to the cross member 12 through the abutting frame 22 to absorb the external force F as described above. This can achieve the simple structure for fixing the protecting frame 20 to the vehicle body 1 to prevent an increase in cost of the fixing structure of the protecting frame 20 to the vehicle body 1.

In the present embodiment, when the external force F acts on the protecting frame 20, the end portion 22a of the abutting frame 22 abuts on the cross member 12 before the first fixing member 13 is detached from the side member 10. Thus, the external force F can be conveyed to the cross member 12 in a relatively early stage after the external force F acts on the protecting frame 20, thereby allowing a reduction in load on the protecting frame 20.

The present embodiment can readily provide the above-mentioned effects when the battery pack 30 is increased in size. Specifically, when the battery pack 30 is increased in size, the protecting frame 20 is located close to a rearward portion of the vehicle. The battery pack 30 is increased in size when a plurality of assembled batteries 31 are used or when the number of cells constituting the assembled battery 31 is increased.

In such a case, the external force applied to the vehicle tends to act on the protecting frame 20. Thus, the protecting frame 20 in the present embodiment can be used to convey the external force applied to the protecting frame 20 efficiently to the cross member 12 through the abutting frame 22.

While the end portion 22a of the abutting frame 22 is caused to abut on the cross member 12 in the present embodiment, the present invention is not limited thereto. Specifically, when the end portion 22a of the abutting frame 22 is caused to abut on a member which constitutes part of the skeleton of the vehicle body 1, the same effects as those in the present embodiment can be provided. Examples of the member which constitutes part of the skeleton of the vehicle body 1 include not only the cross member 12 but also a reinforcement member (gusset) serving as a reinforcement in connecting the frames of the vehicle, for example.

While the abutting frames 22 are connected to the second frame 21b in the present embodiment, the present invention is not limited thereto. For example, the abutting frames 22 can be connected to the third frames 21c. In this case, the external force F applied to the protecting frame 20 can also be transferred to the cross member 12 through the abutting frames 22. In addition, it is essential only that the abutting frames 22 should extend toward the protruding portions 12a of the cross member 12, and the specific shape of the abutting frames 22 can be set as appropriate. Specifically, while each of the abutting frames 22 has a hollow shape in the present embodiment, another shape can be used.

Embodiment 2

Figure 6:
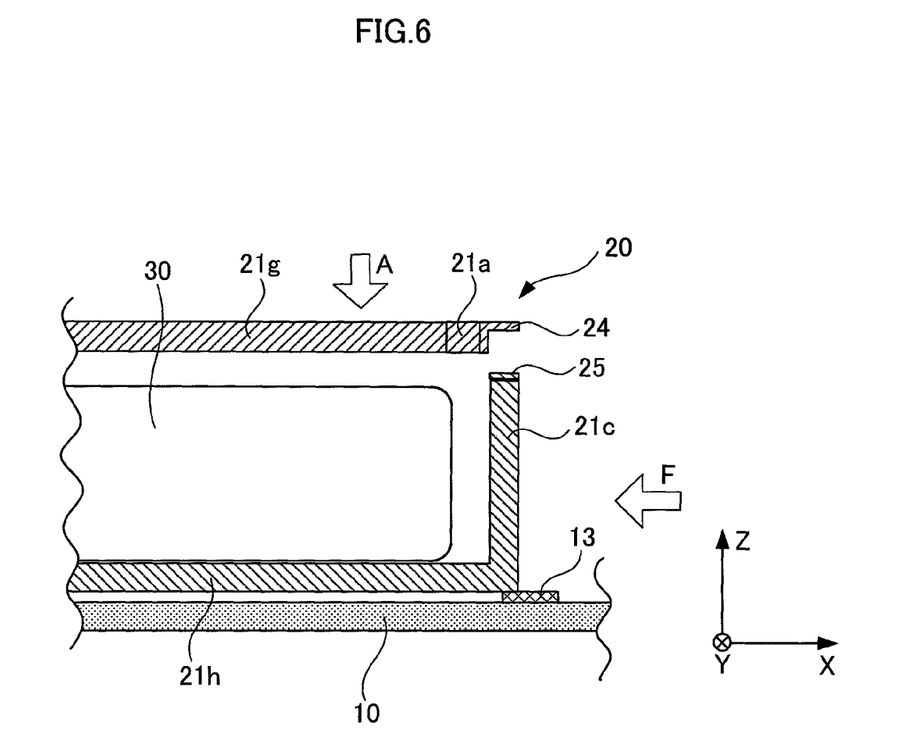
FIG. 6 A side view showing the configuration of a protecting frame in Embodiment 2 of the present invention.

A vehicle in Embodiment 2 of the present invention will be described with reference to FIG. 6. FIG. 6 is a side view showing the configuration of a protecting frame in the present embodiment. In the present embodiment, members having the same functions as those described in Embodiment 1 are designated with the same reference numerals, and detailed description thereof is omitted. In the following, different points from those in Embodiment 1 will be described.

While the protecting frame 20 of Embodiment 1 has the abutting frames 22 which abut on the cross member 12, the abutting frames 22 and the support frames 23 are not provided in the present embodiment.

In a protecting frame 20 of the present embodiment, a connecting member 24 extending along a first frame 21a is fixed to a side face of the first frame 21a. A seventh frame 21g is fixed to the first frame 21a by welding.

A connecting member 25 which is to be connected to the connecting member 24 is fixed to an end of each of third frames 21c. The connecting members 24 and 25 are connected to each other by fastening members such as bolts to fix the first frame 21a to the third frame 21c. FIG. 6 shows the state before the first frame 21a is fixed to the third frame 21c. For fixing the first frame 21a to the third frame 21c, the first frame 21a is moved in a direction indicated by an arrow A.

The third frame 21c is formed integrally with an eighth frame 21h. For example, the third frame 21c and the eighth frame 21h can be formed integrally by molding, or the third frame 21c and the eighth frame 21h can be formed integrally by welding. The third frame 21c of the present embodiment is different from the third frame 21c described in Embodiment 1. Specifically, while the third frame 21c is connected to the second frame 21b extending in the Y direction in Embodiment 1, the third frame 21c is connected to the eighth frame 21h in the present embodiment. In addition, a fixing member 13 is provided in a corner portion of the frame in which the third frame 21c and the eighth frame 21h are formed integrally.

The plurality of third frames 21c are placed in a Y direction in the present embodiment, and a frame is provided between the adjacent ones of the third frames 21c in the Y direction for connection of the third frames 21c. The frame extends in the Y direction similarly to the second frame 21b described in Embodiment 1.

Since the third frame 21c and the eighth frame 21h are formed integrally in the present embodiment, the deformation of the third frame 21c can be suppressed even when an external force F is applied to the protecting frame 20.

Figure 7:
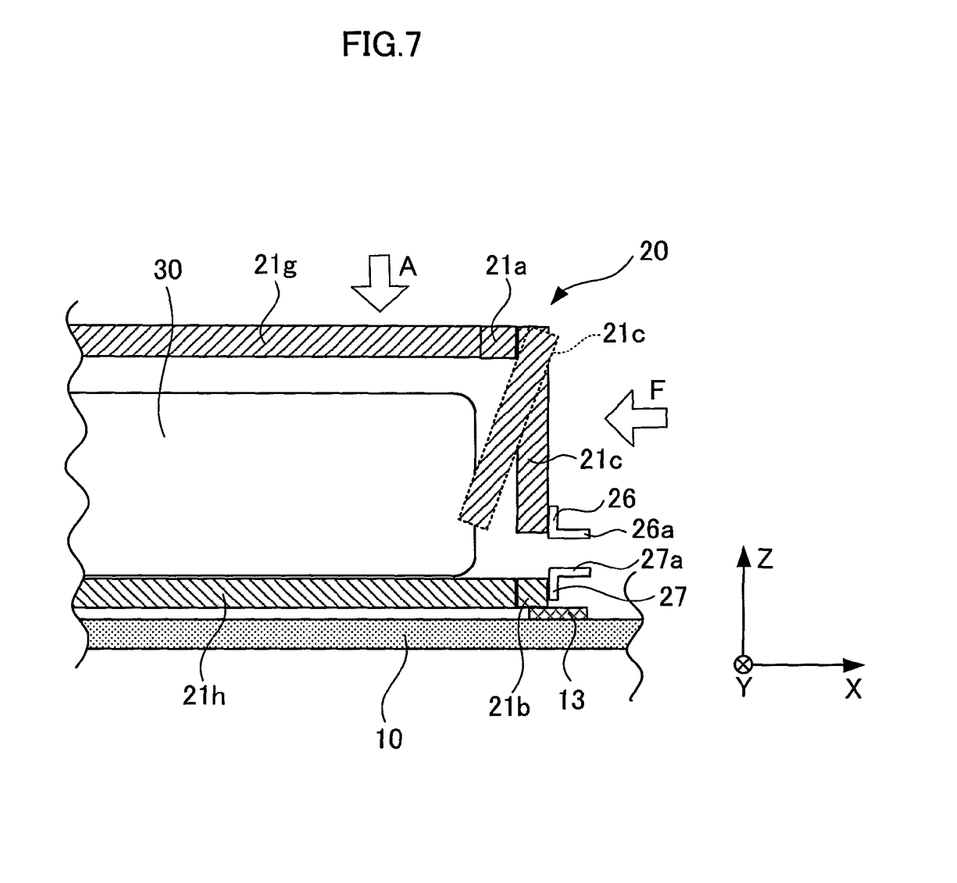
FIG. 7 A side view showing the configuration of a protecting frame in a comparative example of Embodiment 2.

It is contemplated that the protecting frame 20 has the configuration shown in FIG. 7. In this case, however, the third frame 21c is deformed and applies an excessive load to a battery pack 30 when the protecting frame 20 is subjected to an external force F. In the following, the configuration shown in FIG. 7 will be described specifically.

In the configuration shown in FIG. 7, one end of the third frame 21c is fixed to the first frame 21a, and a connecting member 26 is provided at the other end of the third frame 21c. A connecting member 27 which is to be connected to the connecting member 26 is provided for the second frame 21b. The connecting members 26 and 27 have flange portions 26a and 27a opposite to each other in a Z direction, respectively.

The flange portions 26a and 27a are connected to each other by fastening members such as bolts to fix the third frame 21c to the second frame 21b. FIG. 7 shows the state before the third frame 21c is fixed to the second frame 21b. For fixing the third frame 21c to the second frame 21b, the third frame 21c is moved in a direction indicated by an arrow A.

In the configuration of the protecting frame 20 shown in FIG. 7, the third frame 21c may be deformed as shown by dotted lines in FIG. 7 when the external force F is applied. When the third frame 21c is deformed as shown by the dotted lines in FIG. 7, the end portion of the third frame 21c applies an excessive load to the battery pack 30. Since the third frame 21c and the second frame 21b are fixed to each other only by the connection of the connecting members 26 and 27, the third frame 21c is easily detached from the second frame 21b unless the connecting portion of the connecting members 26 and 27 has greater rigidity.

On the other hand, in the configuration of the present embodiment shown in FIG. 6, the third frame 21c and the eighth frame 21h are formed integrally, and the end portion of the third frame 21c is placed adjacent to the side face of the first frame 21a with the connecting member 24 interposed between them. Thus, even when the third frame 21c is subjected to the external force F, the deformation of the end portion of the third frame 21c as shown by the dotted lines in FIG. 7 can be prevented. This can improve the strength of the protecting frame 20 against shocks from the rear of the vehicle.

While the abutting frames 22 and the support frames 23 described in Embodiment 1 are not provided in the present embodiment, the abutting frames 22 and the support frames 23 can be provided similarly to Embodiment 1. This can efficiently suppress the application of an excessive load to the battery pack 30.

Embodiment 3

Figure 8:
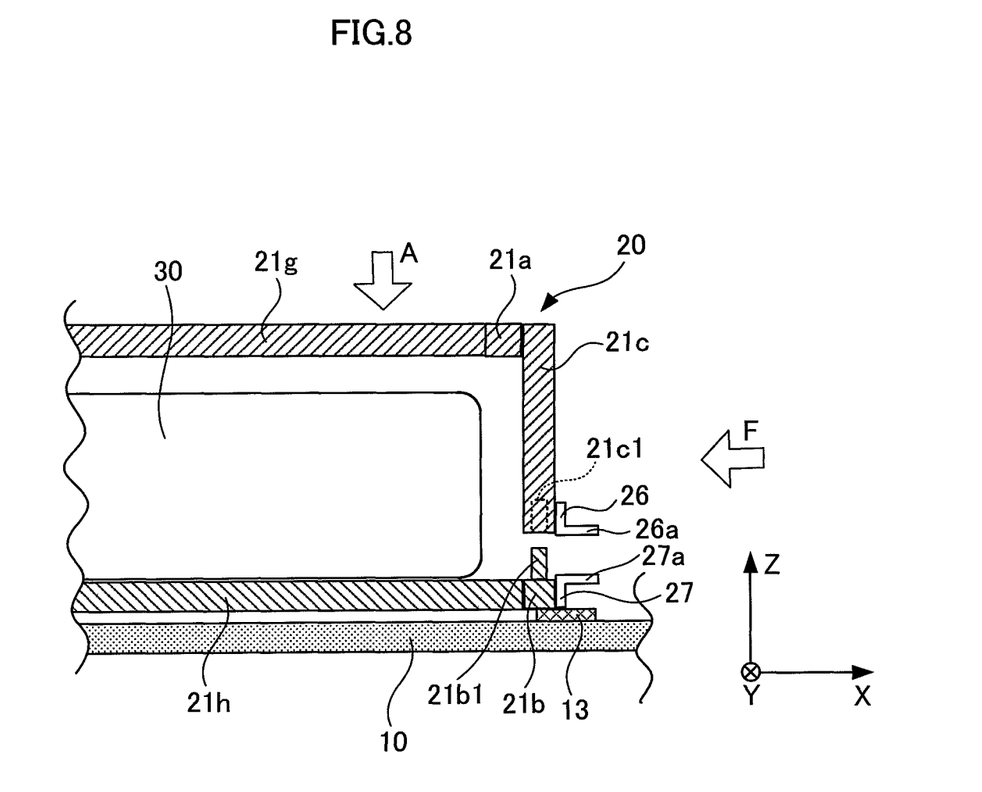
FIG. 8 A side view showing the configuration of a protecting frame in Embodiment 3 of the present invention.

A vehicle in Embodiment 3 of the present invention will be described with reference to FIG. 8. FIG. 8 is a side view showing the configuration of a protecting frame in the present embodiment. In the present embodiment, the configuration of the protecting frame is changed from that in Embodiment 1. Members having the same functions as those described in Embodiment 1 are designated with the same reference numerals.

While the protecting frame 20 in Embodiment 1 has the abutting frames 22 which abut on the cross member 12, the abutting frames 22 and the support frames 23 are not provided in the present embodiment.

In a protecting frame 20 of the present embodiment, a third frame 21c is fixed to a side face of a first frame 21a by welding or the like. A connecting member 26 is attached to an end portion of the third frame 21c and a depression portion 21c1 is formed in the end portion.

A connecting member 27 is attached to a side face of a second frame 21b. The connecting member 27 is connected to the connecting member 26 by fastening members such as bolts. Specifically, flange portions 26a and 27a provided for the connecting members 26 and 27, respectively, are connected to each other by fastening members such as bolts to fix the third frame 21c to the second frame 21b.

A projection portion 21b1 which is to be inserted into the depression portion 21c1 of the third frame 21c is formed integrally with the side face of the second frame 21b that is opposed to the end portion of the third frame 21c. In the present embodiment, the third frame 21c is moved toward the second frame 21b in a direction indicated by an arrow A to insert the projection portion 21b1 into the depression portion 21c1 of the third frame 21c and the connecting members 26 and 27 are fixed by fastening members to constitute the protecting frame 20. In the present embodiment, the strength of the protecting frame 20 is ensured by the engagement of the projection portion 21b1 and the depression portion 21c1 and the connection of the connecting members 26 and 27.

In the present embodiment, the strength of the protecting frame 20 can be improved as compared with the configuration shown in FIG. 7. Even when the protecting frame 20 is subjected to an external force F, the deformation of the third frame 21c as shown by the dotted lines in FIG. 7 can be prevented. In addition, in the present embodiment, the abutment of the projection portion 21b1 on the depression portion 21c1 can enhance the strength in the connecting portion of the third frame 21c and the second frame 21b. This can achieve a simple configuration of the connecting members 26 and 27. Specifically, it is essential only that the connecting structure of the connecting members 26 and 27 should be formed such that the projection portion 21b1 is not be detached from the depression portion 21c1.

While the present embodiment has the configuration in which the projection portion 21b1 is inserted into the depression portion 21c1, the present invention is not limited thereto. For example, the projection portion 21b1 can be in contact with the side face of the third frame 21c that is opposed to the battery pack 30. In this case, the position of the projection portion 21b1 is different from that in the configuration shown in FIG. 8. In this configuration, when the protecting frame 20 is subjected to the external force F, the abutment of the side face of the third frame 21c on the projection portion 21b1 can also suppress the deformation of the end portion of the third frame 21c.

While the abutting frames 22 and the support frames 23 described in Embodiment 1 are not provided in the present embodiment, the abutting frames 22 and the support frames 23 can be provided similarly to Embodiment 1. This can efficiently suppress the application of an excessive load to the battery pack 30.

While the depression portion 21c1 is provided for the third frame 21c and the projection portion 21b1 is provided for the second frame 21b in the present embodiment, the present invention is not limited thereto. Specifically, a projection portion corresponding to the projection portion 21b1 can be provided for the third frame 21c, and a depression portion corresponding to the depression portion 21c1 can be provided for the second frame 21b.

Embodiment 4

Figure 9:
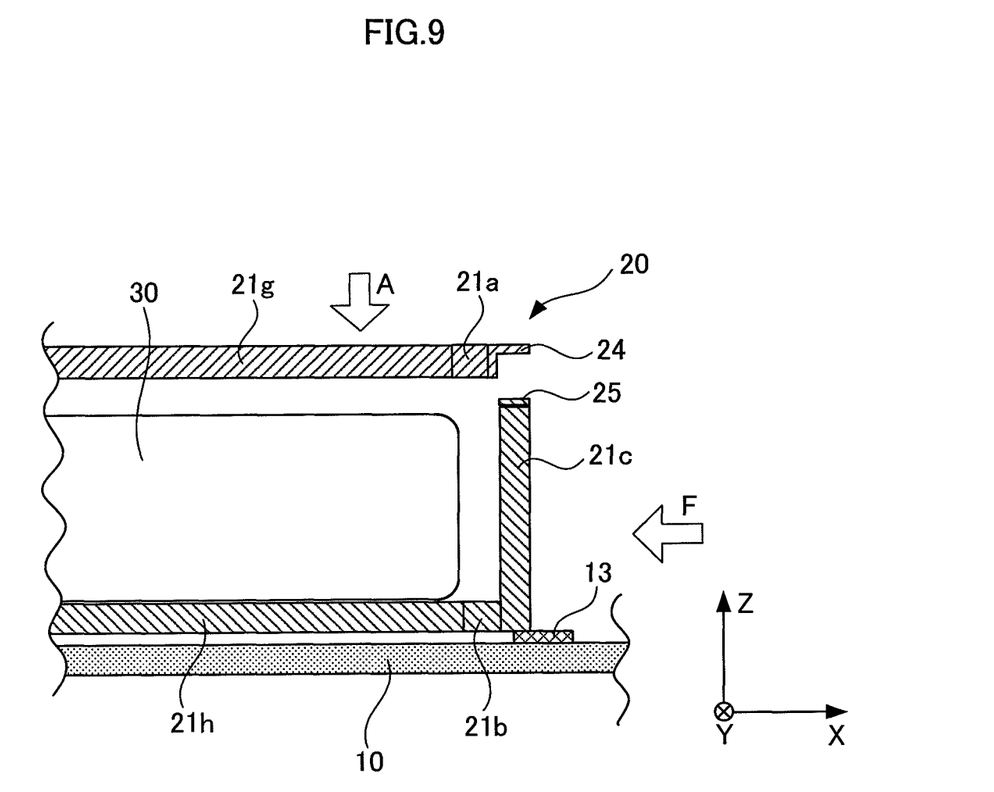
FIG. 9 A side view showing the configuration of a protecting frame in Embodiment 4 of the present invention.

A vehicle in Embodiment 4 of the present invention will be described with reference to FIG. 9. FIG. 9 is a side view showing the configuration of a protecting frame in the present embodiment. In the present embodiment, members having the same functions as those described in Embodiments 1 and 2 are designated with the same reference numerals, and detailed description thereof is omitted. In the following, different points from those in Embodiments 1 and 2 will be described.

While the protecting frame 20 in Embodiment 1 has the abutting frames 22 which abut on the cross member 12, the abutting frames 22 and the support frames 23 are not provided in the present embodiment. In addition, while the protecting frame 20 in Embodiment 1 has the third frames 21c provided on the upper surface of the second frame 21b, a side face of a third frame 21c is connected to a side face of a second frame 21b in the present embodiment. A fixing member 13 is provided for an end portion of the third frame 21c.

In the protecting frame 20 of the present embodiment, the deformation of end portion of the third frame 21c can be suppressed even when an external force F is applied. One end portion of the third frame 21c is connected to a first frame 21a extending in a Y direction, while the other end portion of the third frame 21c is connected to the second frame 21b extending in the Y direction. Thus, both end portions of the third frame 21c are prevented from being deformed by the first frame 21a and the second frame 21b. This can enhance the strength of the protecting frame 20.

While the abutting frames 22 and the support frames 23 described in Embodiment 1 are not provided in the present embodiment, the abutting frames 22 and the support frames 23 can be provided similarly to Embodiment 1. This can efficiently suppress the application of an excessive load to the battery pack 30.

The invention claimed is:

1. A protecting structure for a power source apparatus, comprising:
   a frame unit in which a plurality of frames are connected to each other and surround the power source apparatus mounted on a vehicle body; and
   an abutting frame extending in a direction in which an external force in a predetermined direction acts on a vehicle, a first end thereof connected to the frame unit, and a second end thereof being away from the vehicle body, the abutting frame adjacent to the frame unit in a direction perpendicular to the direction of the external force, the second end being located between ends of the frame unit in the direction of the external force,
   wherein the abutting frame is displaced in the predetermined direction in response to displacement of the frame unit subjected to the external force in the predetermined direction and the second end of the abutting frame abuts on the vehicle body.

2. The protecting structure for the power source apparatus according to claim 1, wherein the power source apparatus is formed of a secondary battery.

3. The protecting structure for the power source apparatus according to claim 1, wherein the vehicle body is a cross member extending in a direction from left to right of the vehicle.

4. The protecting structure for the power source apparatus according to claim 1, wherein the first end of the abutting frame is on a receiving side of the external force with respect to the second end of the abutting frame.

5. The protecting structure for the power source apparatus according to claim 1, wherein the power source apparatus is placed in a rearward position of the vehicle.

6. The protecting structure for the power source apparatus according to claim 5, wherein the vehicle body is a cross member extending in a direction from left to right of the vehicle.

7. The protecting structure for the power source apparatus according to claim 1, further comprising a fixing member for fixing the frame unit to the vehicle body.

8. The protecting structure for the power source apparatus according to claim 7, wherein the power source apparatus is placed in a rearward position of the vehicle.

9. The protecting structure for the power source apparatus according to claim 7, wherein the vehicle body is a cross member extending in a direction from left to right of the vehicle.

* * * * *